United States Patent Office 3,453,304
Patented July 1, 1969

3,453,304
PROCESS FOR PREPARING SILOXANE DIOLATES
Terry G. Selin, Schenectady, N.Y., assignor to General Electric Company, a corporation of New York
No Drawing. Filed Dec. 19, 1966, Ser. No. 602,541
Int. Cl. C07f 7/08, 7/02
U.S. Cl. 260—448.2                    10 Claims

ABSTRACT OF THE DISCLOSURE

Alkali metal aromatic siloxane diolates are prepared by reacting arylsiloxanediols and elemental sodium or potassium in an aromatic hydrocarbon solvent at relatively low reaction temperature. Silovanols corresponding to the diolates are formed by neutralizing the diolates with acids.

---

In my application United States Ser. No. 514,660, the preparation of arylsiloxanediols is described.

This invention has to do with alkali metal aromatic siloxane diolates and with a process for preparing the diolates. The invention also relates to a process for preparing the corresponding hydroxy compounds of the diolates.

It is an object of the present invention to provide a process for preparing a certain class of aromatic siloxane diolates.

A further object is to provide a process for preparing the corresponding hydroxy compounds of the aromatic siloxane diolates.

Additional objects of the invention will be apparent from the following description.

In accordance with the present invention, there is provided a process for preparing aromatic siloxane diolates having the formula:

(1)      $MO[(R)_2SiO]_{2n}M'$ by effecting reaction between an arylsiloxanediol having the formula:

(2)      $HO[(R)_2SiO]_nH$ and elemental sodium or potassium in the presence of an aromatic hydrocarbon solvent in the temperature range of from about 10° C. to 70° C., where M and M' are sodium or potassium, R is an aryl radical, and $n$ is an integer equal to at least 2, and preferably is from 2 to 4, inclusive. The diolates of Formula 1 can be converted to the corresponding diols having the formula:

(3)      $HO[(R)_2SiO]_{2n}H$ by neutralization of the diolate.

The process of this invention is unique in that it provides a heretofore unavailable method of doubling the chain length of a relatively low molecular weight aromatic siloxanediol(dimerizing) in unusually high yields with little formation of undesirable by-products. While prior art methods have been available for condensing aromatic siloxanediols, these prior art processes have always led to the formation of a very high percentage of products other than the dimerized product.

The aryl radicals represented by R of Formula 1 include both unsubstituted aryl radicals and radicals containing substituents which are inert under the conditions of the reaction. Thus, the term includes unsubstituted aryl radicals, such as phenyl and naphthyl, as well as radicals containing nuclear substituted halogen groups, nitro groups, triorganosilyl groups, dialkylamino groups, alkoxy radicals, aryl radicals, aryloxy radicals and cyano radicals. Illustrative of specific radicals represented by R include p-chlorophenyl, p-bromophenyl, p-nitrophenyl, m-trimethylsilylphenyl, p-dimethylaminophenyl, o-methoxyphenyl, p-phenoxyphenyl, p-diphenyl and p-cyanophenyl radicals.

From the foregoing description of the radicals represent by R, it can be seen that there are many different compositions within the scope of Formula 2 which represent starting material for the preparation of the aromatic siloxanediolates of the present invention. Illustrative of compositions within the scope of Formula 2 are: tetraphenyldisiloxanediol-1,3; tetra-m-tolyldisiloxanediol-1,3, tetradiphenyldisiloxanediol-1,3; hexaphenyltrisiloxanediol-1,5 and hexatolyltrisiloxanediol-1,5. In addition to products in which all of the R' groups are the same, within the contemplation of this invention are products in which the R' groups can be different. For example, illustrative of aromatic siloxanediols within the scope of Formula 2 with different R group substituents are: 1,1-p-ditolyl - 3,3 - diphenyldisiloxanediol - 1,3; 1,3 - p - tolyl-1,3-diphenyldisiloxanediol-1,3; 1,3-bis-(m-trimethylsilylphenyl)-1,3-dipheynldisiloxanediol-1,3; and 1,3,5-tris-(p-dimethylaminophenyl)-1,3,5-triphenyltrisiloxanediol-1,5.

Where the siloxanediol of recited Fodmula 2 is unsymmetrical, the reaction of the present invention will produce a variety of dimerized products. By way of illustration, 1,1-diphenyl-3,3-di-p-ditolyldisiloxane-1,3-diol can be reacted with sodium to form a mixture including the corresponding disodium-1,1,5,5-tetraphenyl-2,2,7,7-tetratolyltetrasiloxane-1,7-diolate, disodium-1,1,7,7-tetraphenyl-3,3,5,5-tetratolyltetrasiloxane-1,7-diolate, and disodium - 1,1,7,7 - tetratolyl - 3,3,5,5 - tetraphenyltetrasiloxane-1,7-diolate.

Methods for the preparation of polysiloxanediols are known. For example, a tetraaryldisiloxanediol can be prepared by reacting a diarylsilanediol with an amine hydrohalide to form a diarylsiloxanediol amine hydrohalide complex and then decomposing the complex with water and a suitable solvent, as described in my application United States Ser. No. 514,660, filed Dec. 17, 1965.

An octaaryltetrasiloxanediol can be prepared in keeping with the process described herein and can then be reacted with an alkali metal in the presence of an aromatic solvent, to form a hexadecaaryloctasiloxane diolate.

The process of the present invention can best be understood by the following typical reaction:

$4HO[(R)_2SiO]_nH + 6Na \rightarrow$
$\quad 2NaO[(R)_2SiO]_{2n}Na + 3H_2 + NaOH$ As shown by the above reaction, 1.5 g. atoms of sodium (or potassium) are employed for each molecule of the polysiloxanediol of Formula 2 with the liberation of hydrogen and the formation of the dimerized product and sodium hydroxide. While the above reaction shows the stoichiometric ratio, it is preferred to have an excess of alkali metal in the reaction mixture. The presence of excess alkali metal increases the rate of reaction, and it is preferred to have the alkali metal present in a 50% to 200% excess.

As indicated above, solvents used for the reaction of the diol and the alkali metal for aromatic hydrocarbons. Typical solvents include benzene, toluene, xylene, ethylbenzene, cumene, methyl naphthylenes and diphenyl. The amount of solvent employed in the reaction is not critical, with the requirement being the use of sufficient solvent to dissolve the diol or Formula 2. In general, it is found that a suitable amount of solvent is from about 3 to 10 parts by weight per part of the diol of Formula 2. Additional amounts of solvents can be employed but no particular advantage is gained thereby.

In conducting the reaction to form the diolate of Formula 1, the diol of Formula 2 is dissolved in the solvent and thereafter the sodium or potassium is added in small increments and the reaction mixture is maintained at the reaction temperature.

Reaction temperatures can range from about 10° C. to about 70° C. Preferred temperatures are of the order of 50 to 60° C. Reaction time at 10 to 70° C. ranges from about 1 to about 48 hours. At temperatures below about 10° C., the reaction rate is so relatively slow as to make operation at such temperatures commercially undesirable. At temperatures above about 70° C., the reaction time is decreased but yield of the desired product is sacrificed. At such higher temperatures, siloxane diolates of longer chains are formed.

At the desired temperature range of about 50 to 60° C., upon the addition of the sodium or potassium metal, hydrogen evolution begins and precipitation of sodium hydroxide also begins. The diolate formed in the process remains in solution at these temperatures. Completion of the reaction is indicated by the cessation of hydrogen evolution from the reaction mixture, at which time the reaction mixture consists of a solution of the diolate in the aromatic solvent and a precipitate of sodium or potassium hydroxide. This precipitate is separated from the reaction mixture by filtration or decantation. The liquid phase is then cooled to a temperature of about room temperature, i.e., 20 to 25° C., at which temperature the diolate precipitates from the aromatic solvent. The diolate is separated by filtration and remaining aromatic solvent is removed by passing a dry inert gas over the diolate. Where the reaction is effected at temperatures below the preferred temperature range of 50 to 60° C., it is sometimes desirable to heat the reaction mixture to this temperature at the end of the reaction so as to insure that the diolate is in solution and that the solution of the diolate can be separated from the sodium hydroxide precipitate and subsequently purified as described above.

The diolate of Formula 1 is converted to the silanol of Formula 3 by the simple expedient of neutralization of the diolate with a suitable acid. Suitable acids are those having a hydogen ion concentration of less than about 2 molar. When the hydrogen ion concentration is much greater than 2 molar, there is a tendency to cause condensation of the desired silanol products rather than simple neutralization. The acids which can be employed for the neutralization include mineral acids, such as hydrochloric or sulfuric, as well as organic acids, such as acetic. Since it is desired to have the stated maximum hydrogen ion concentration, when mineral acids are employed they are employed as dilute aqueous solutions. On the other hand, acetic acid can be employed in the glacial acetic acid form, since even in such form, the hydrogen ion concentration is in the appropriate range. Regardless of whether the acid is mineral or organic, the amount of acid required is the amount necessary to neutralize all of the diolate.

When a mineral acid is employed, it is found desirable to employ a mixture of an aromatic solvent or an aliphatic ether solvent with the aqueous mineral acid. The diolate is added to this mixture. During the course of the neutralization, the resulting dimerized product of Formula 3 which results from the neutralization dissolves in the aromatic or ether solvent, and the salts which result from the neutralization dissolve in the aqueous phase. The two phases are separated and the solvent is then stripped from the diol to produce the desired product. Where an organic acid, such as glacial acetic acid is employed, the diolate is slowly added to the stirred glacial acetic acid, which causes neutralization of the diolate with the formation of the dimerized diol. The resulting mixture is then added to an excess of water and the diol precipitates from the reaction mixture and is recovered and can be washed with water to remove any salts or residual acid.

Temperatures employed for acidification range from about 20° C. to about 150° C. dependent upon acid strength. The more dilute the acid, the higher the temperature may be; and with less dilute acids, lower temperatures within the 20–150° C. range are employed.

The invention is illustrated, rather than limited, by the following typical examples. All parts are by weight unless indicated otherwise.

Example 1

Tetraphenyldisiloxane-1,3-diol was reacted with sodium metal to form disodium octaphenyltetrasiloxane-1,7-diolate as indicated by the following equation:

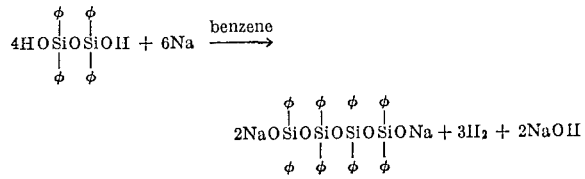

where $\phi$ is phenyl.

In a one liter, three-necked flask (equipped with pot thermometer and drying tube connected to a nitrogen stream), 82.8 g. (0.2 mole) of tetraphenyldisiloxane-1,3-diol were dissolved in 400 ml. of dry benzene. The air above the resulting solution was replaced by a nitrogen atmosphere. Then, 13.8 (0.6 g. atoms)—100% excess) of freshly cut sodium (as large pieces) were added to the diol solution. The resulting mixture was maintained at a temperature of 15–25° C. by means of a cooling bath. Hydrogen evolved quite slowly. After twenty hours, the mixture was warmed to 50° C. to increase the rate of hydrogen evolution. It was also noted at this time that several large droplets of a second liquid phase were present. After one hour at 50° C. the benzene solution was decanted from the droplets of the second liquid phase and was then filtered through a course fritted-glass funnel. The clear filtrate, upon cooling, yielded the desired crystalline product. The product was isolated by filtration of the mixture. The yield was 56 g. or 66% of theory. The product (after drying) had a melting point of 179–184° C. (with decomposition). The product was found to contain 4.7% Na upon standard acid titration compared to the theoretical value of 5.4% Na for the structure NaO($\phi_2$SiO)$_4$Na. Further structure proof was indicated by its infrared spectrum and more particularly by its conversion to the parent diol as revealed in Example 2, below. The droplets of the second liquid phase crystallized upon standing and were found to be a highly concentrated aqueous solution of sodium hydroxide in accordance with the equation given above.

Slightly lower yields were obtained when the reaction was carried out at 60–70° C. but the reaction times were reduced to about 4 hours.

Example 2

Octaphenyltetrasiloxane-1,7-diol was prepared by neutralizing the product of Example 1, as indicated by the following equation:

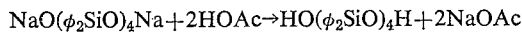

To 200 ml. of acetic acid in a beaker were added 84 g. of the crystalline diolate prepared as described in Example 1. Heat was evolved as the diolate began to dissolve and, upon stirring, sodium acetate began to precipitate. The resulting mixture was then poured slowly into 1500 ml. of water with rapid stirring. This resulted in a white crystalline precipitate which was collected by suction filtration. After drying, the product amounted to 62 g. (80% of theory). Recrystallization from 1:1 hexane-benzene mixture provided 51 g. of pure

with M.P. 129–130° C. (Kipping and Robison [J. Chem. Soc., 105, 484–500 (1914)] report an M.P. of 128.5° C.). The product was further characterized as "tetramerdiol" by comparing its infrared spectrum with that of a reference sample of HO(φ₂SiO)₄H prepared by a different route. The mixed melting point of the product and the reference sample was 129–130° C.

Example 3

Octaphenyltetrasiloxane-1,7-diol was also prepared by treating disodium octaphenyltetrasiloxane-1,7-diolate in the following manner. A mixture of 19 g. of disodium octaphenyltetrasiloxane-1,7-diolate as prepared in Example 1 was combined with 50 ml. of benzene in a small separatory funnel. This mixture was then treated with 50 ml. of 5% aqueous acetic acid to convert the diolate to the diol. The aqueous layer was isolated and discarded but the resulting benzene solution of the diol was washed with water to remove traces of residual acid. The benzene solution was finally isolated, dried briefly over anhydrous Na₂SO₄, and was evaporated under vacuum to remove the solvent. There remained a viscous oil which crystallized on standing. When this crystalline mass was recrystallized from a mixture of benzene and hexane, 9.5 g. of octaphenyltetrasiloxane-1,7-diol was obtained having a melting point of 129–130° C.

The aromatic siloxane diolates of general Formula 1 and the diols of general Formula 3 can be used as intermediates for the preparation of block copolymers and cyclic siloxanes. For example, a diolate reacts readily with a chlorosilane to form siloxanes, viz:

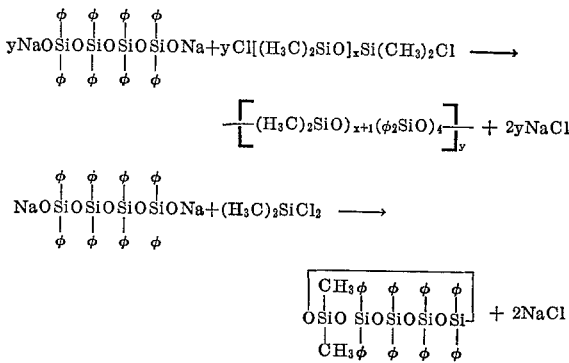

While the foregoing description and examples illustrate a number of the embodiments of this invention, it is to be understood that the invention relates broadly to the preparation of the alkali metal diolates of the type defined by general Formula 1, and to the preparation of the corresponding hydroxy compounds defined by general Formula 3. The scope of the invention, therefore, is defined by the appended claims.

I claim:

1. The process for the preparation of an alkali metal aromatic siloxane diolate having the general formula:

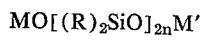

which comprises reacting an aromatic siloxanediol having the formula:

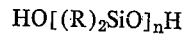

with sodium or potassium in the presence of an aromatic hydrocarbon solvent at a temperature in the range of from about 10° C. to about 70° C., wherein M and M' are both either sodium or potassium, R is an aryl radical, and $n$ is an integer of at least 2.

2. The process of claim 1 wherein one molar proportion of the diol is so reacted with at least about 1.5 gram atoms of the alkali metal.

3. The process of claim 1 wherein the $n$ is 2.

4. The process of claim 1 wherein R is phenyl.

5. The process of claim 1 where R is phenyl and $n$ is 2.

6. The process of claim 3 wherein the diolate is disodium octaphenyltetrasiloxane-1,7-diolate, and where tetraphenyldisiloxane-diol-1,3 is reacted with an excess of sodium in the presence of benzene at a temperature of from about 10° C. to about 70° C.

7. The process for forming first aromatic siloxanediol having the formula:

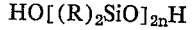

which comprises (A) effecting reaction between a second aromatic siloxanediol having the formula:

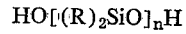

and elemental potassium or sodium in the presence of an aromatic hydrocarbon solvent in the temperature range of from about 10° C. to 70° C. to form an aromatic siloxane diolate having the formula:

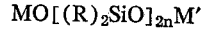

where M and M' are both sodium or potassium, R is an aryl radical and $n$ is an integer equal to at least 2; (B) isolating the resulting siloxane diolate which is formed, (C) neutralizing the isolated diolate with an acid; and (D) isolating the desired second aromatic siloxanediol.

8. The process of claim 7 in which R is phenyl.

9. The process of claim 7 in which $n$ is 2.

10. The process of claim 7 in which R is phenyl and $n$ is 2.

References Cited

UNITED STATES PATENTS 3,337,497    8/1967    Bostick ———— 260—448.2 X

TOBIAS E. LEVOW, *Primary Examiner.*

P. F. SHAVER, *Assistant Examiner.*

U.S. Cl. X.R.

260—46.5